(12) United States Patent
Fenwick et al.

(10) Patent No.: US 7,749,402 B2
(45) Date of Patent: Jul. 6, 2010

(54) METHODS OF PREVENTING FROST FORMATION AND FACILITATING THE REMOVAL OF WINTER PRECIPITATION RELATIVE TO A WINDSHIELD AND COMPOSITIONS FOR USE THEREIN

(75) Inventors: Andrew E. Fenwick, Evansville, IN (US); Rebecca A. Marshall, Morris, CT (US); David L. Balog, Naugatuck, CT (US)

(73) Assignee: Honeywell International Inc., Morristown, NJ (US)

( * ) Notice: Subject to any disclaimer, the term of this patent is extended or adjusted under 35 U.S.C. 154(b) by 200 days.

(21) Appl. No.: 11/833,492

(22) Filed: Aug. 3, 2007

(65) Prior Publication Data

US 2008/0048146 A1    Feb. 28, 2008

Related U.S. Application Data

(60) Provisional application No. 60/837,460, filed on Aug. 11, 2006.

(51) Int. Cl.
    *C09K 3/18*    (2006.01)
(52) U.S. Cl. .............................. 252/70; 106/13; 252/71
(58) Field of Classification Search .................. 106/13; 252/70, 71
    See application file for complete search history.

(56) References Cited

U.S. PATENT DOCUMENTS

| 3,989,633 | A | | 11/1976 | Frisque |
| 4,350,602 | A | * | 9/1982 | Schiller ..................... 252/75 |
| 5,932,529 | A | | 8/1999 | Storey |
| 6,077,898 | A | * | 6/2000 | Flores ..................... 524/425 |
| 6,461,537 | B1 | | 10/2002 | Turcotte et al. |
| 2006/0036053 | A1 | * | 2/2006 | Gallagher et al. ............. 528/10 |

FOREIGN PATENT DOCUMENTS

| CA | 877851 | * | 8/1971 |
| GB | 2050398 A | * | 1/1981 |
| WO | WO2006023413 A | | 2/2006 |
| WO | WO2006099500 A | | 9/2006 |

OTHER PUBLICATIONS

International Search Report PCT/US2007/075192 dated Nov. 22, 2007.
International Preliminary Report on Patentability dated Feb. 26, 2009 for PCT/US2007/075192.

* cited by examiner

*Primary Examiner*—Anthony J Green
(74) *Attorney, Agent, or Firm*—Cantor Colburn LLP

(57) ABSTRACT

Disclosed herein is a winter precipitation barrier composition, comprising: a retaining agent, a solvent, and optionally, an auxiliary component, such as a rheology/viscosity modifier, surfactant, detergent, foaming/defoaming additive, humectant, dye, colorant, fragrance, or a combinations thereof. In one embodiment, the retaining agent comprises a primarily hydrophobic monomer or a hydrophilic monomer.

22 Claims, No Drawings

METHODS OF PREVENTING FROST FORMATION AND FACILITATING THE REMOVAL OF WINTER PRECIPITATION RELATIVE TO A WINDSHIELD AND COMPOSITIONS FOR USE THEREIN

BACKGROUND

Typical windshield washer fluid compositions can wash away particles that are deposited on surfaces. They generally contain water and a water miscible alcohol. The water and water miscible alcohol composition is selected to meet certain functional characteristics, such as the ability to remove vision obscuring materials and the ability to melt frost and ice formed on the windshield.

However, the primary function of such windshield washer compositions is assisting the windshield wipers in the removal of vision obscuring materials from a windshield. Vision obscuring materials can include several different materials commonly deposited on windshields including dirt, dust, grime, bugs, sap, bird droppings, frost, ice, snow, and combinations thereof. Although these compositions can be used to assist in the removal of vision obscuring materials, they have typically failed to prevent or impede the deposition of the materials on the windshield. Moreover, none of these compositions are known to provide the dual function of preventing deposition of vision obscuring materials while making it easier to remove any vision obscuring material that has accumulated.

Removing vision-obscuring materials from windshields causes undesired delays. Further, particles will often adhere to the windshield such that substantial amounts of windshield washer fluid and/or large amounts of mechanical action are needed to remove the vision obscuring material. Therefore, vehicle operators would benefit from a windshield treatment that reduced the amount of undesired delays, the amount of windshield washer fluid used, and the amount of mechanical action necessary to restore clarity to the windshield.

Windshield as used herein refers to any glass panel that a vehicle driver or passenger looks through or at, or which light is desired to pass through or reflect from, such as an exterior automotive lighting and mirrors.

Drivers thus particularly desire a method whereby the accumulation of vision obscuring material on a windshield could be either entirely prevented or greatly reduced while simultaneously making it easier to remove any vision obscuring material. The terms 'prevent' or 'impede' as used herein refer to the reductions in the area, thickness, hardness, and/or degree of adhesion of any accumulated winter precipitation. It will be appreciated that reductions in the degree of adhesion of any accumulated winter precipitation to a windshield will facilitate the removal of such winter precipitation from said windshield. That is, it becomes easier to scrape, rinse, wipe, and/or brush the vision obscuring material from the windshield.

Thus, there continues to be a need for improved compositions and methods for preventing the deposition of vision obscuring material on a windshield while simultaneously making it easier to remove any accumulated vision obscuring material from a windshield.

SUMMARY

Disclosed herein is a winter precipitation barrier composition, comprising: a retaining agent, a solvent, consisting of one or more individual materials optionally, an auxiliary component, such as a rheology/viscosity modifier, surfactant, detergent, foaming/defoaming additive, humectant, dye, colorant, fragrance, or a combinations thereof. In one embodiment, the retaining agent comprises a primarily hydrophobic monomer or a hydrophilic monomer.

Also disclosed are methods of preventing frost and removing winter precipitation from a windshield, comprised of applying the disclosed winter precipitation barrier compositions on a windshield.

The above-described and other features will be appreciated and understood by those skilled in the art from the following detailed description and appended claims.

DETAILED DESCRIPTION

Described herein are barrier compositions. It will be appreciated that in some cases, a barrier composition will entirely prevent the deposition of particles on a windshield, while in some cases the barrier composition will reduce an amount of particle deposition on a windshield with regards to at least one of area, thickness or hardness relative to an untreated windshield.

The terms "hydrophobic" and "hydrophilic" will be used herein to describe components of the barrier composition. The term hydrophobic as used herein refers to a component that has a low propensity of forming hydrogen bonds with water and therefore is repelled by water. Therefore, hydrophobic components have a tendency to bond with similar components and a tendency not to bond with water. The term hydrophilic as used herein refers to a component that has a high propensity for forming hydrogen bonds with water. Therefore, hydrophobic components have a tendency to transiently bond with water. It will be appreciated by those skilled in the art that the terms "hydrophobic" and "hydrophilic" are relative terms, and thus have no absolute, quantifiable definition.

In addition, it has also been found that the barrier compositions facilitate the removal of any accumulated winter precipitation. That is, it has been found that the use of the winter precipitation barrier compositions makes it easier to remove any particles (for example, dirt, dust, mud, grime, grease, pollutants, soot, particulates, and like particles). Those of skill in the art will appreciate that particle deposition such as humidity, temperature, wind velocity, and/or time of exposure.

In one embodiment, the disclosed winter precipitation barrier composition comprises a retaining agent and a solvent.

In another embodiment, the disclosed winter precipitation barrier will consist essentially of a retaining agent and a solvent. It will be appreciated that the main and necessary function of the disclosed winter precipitation barrier is in the prevention of winter precipitation and/or the facilitation of removal of winter precipitation. Accordingly, in this embodiment, the disclosed winter precipitation barrier may also contain one or more of at least one of an auxiliary compound, rheology/viscosity modifier, surfactant, detergent, foaming/defoaming additive, humectant, dye, colorant, fragrance, and combinations thereof, that do not affect the basic purpose of the disclosed winter precipitation barrier.

In addition to the retaining agent and the solvent, in other embodiments, the disclosed winter precipitation barrier composition can comprise at least one of a rheology/viscosity modifier, surfactant, detergent, foaming/defoaming additive, humectant, dye, colorant, fragrance, and combinations thereof.

In one embodiment, the disclosed winter precipitation barrier composition will consist of a retaining agent and a solvent. In yet another embodiment, the disclosed winter precipitation barrier composition will consist of a retaining agent and a solvent and one or more of at least one of an auxiliary compound, rheology/viscosity modifier, surfactant, detergent, foaming/defoaming additive, humectant, dye, colorant, fragrance, and combinations thereof.

In one exemplary embodiment, the disclosed winter precipitation barrier composition will be free of any components comprising a silicon atom. In one especially exemplary embodiment, the disclosed winter precipitation barrier composition will be free of any surfactants, oils, or additives comprising a silicon atom.

The term "retaining agent" as used herein refers to a substance that increases the tenacity of the winter precipitation barrier composition or the capacity of the winter precipitation barrier composition to remain on the windshield. Therefore, the retaining agent increases a duration that that the winter precipitation barrier composition remains on the windshield when the windshield is exposed to winter precipitation.

In one embodiment, in addition to increasing the tenacity of the winter precipitation barrier composition, the retaining agent will enhance the frost protecting properties of the winter precipitation barrier composition. In one embodiment, in addition to increasing the tenacity of the winter precipitation barrier composition, the retaining agent will increase the ease of removal of frost or winter precipitation such as ice, snow, or sleet that accumulates on the windshield. The retaining agent can facilitate the removal of winter precipitation by decreasing the adhesion level between the winter precipitation and the windshield. Further, the retaining agent can facilitate the removal of winter precipitation by physically or chemically interacting with the winter precipitation.

In one embodiment, the retaining agent comprises a polymer or a copolymer. In one exemplary embodiment, the winter precipitation barrier composition comprises a polymer comprising only one type of monomer (e.g., one type of hydrophobic monomer or one type of hydrophilic monomer). In other exemplary embodiments, the winter precipitation barrier composition comprises a copolymer comprising two or more different types of monomers (e.g., copolymers having two or more different types of hydrophobic monomers and copolymers having two or more different types of hydrophilic monomers along with copolymers that have both hydrophobic and hydrophilic monomers). In other exemplary embodiments, the composition comprises two or more different polymers.

Several chemical properties of the polymer or the copolymer will affect the performance properties of the winter precipitation composition. These properties include hydrophobicity, hydrophilicity, molecular weight, volatility, and the presence of specific functionalities, for example, the presence of hydroxyl groups, ether linkages, amines, carboxylic acids, etc.

Without being limited by theory, it is believed that the hydrophobic component provides the winter precipitation barrier composition with a sufficient propensity such that the composition will not be significantly removed by winter precipitation (snow, frost, or ice) or typical atmospheric humidity. Also, without being bound by theory, it is believed that the hydrophilic component will allow the winter precipitation barrier composition along with winter precipitation disposed on the winter precipitation barrier, to be adequately removed by standard removal methods. These standard removal methods can include washing away the winter precipitation using, for example, windshield washer fluid and can include physical means such as wiping away the winter precipitation manually or wiping away winter precipitation with windshield wipers. Therefore, it is believed that an optimal tenacity and removal can be achieved by controlling the ratio of hydrophobic component to hydrophilic component in the polymer.

Exemplary hydrophobic monomers include monomers derived from ethylene oxide, propylene oxide, higher alkylene oxides, vinyl acetate, methyl methacrylate, ethyl ethacrylate, ethylene, propylene, higher alkenes, hydroxy propyl acetate, styrene, octyl methacrylate, lauryl methacrylate, stearyl methacrylate, and biphenyl methacrylate. In an exemplary embodiment, the hydrophobic monomer comprises at least one hydroxyl group. In an exemplary embodiment, the hydrophobic monomer comprises a glycol, and more specifically comprises a propylene glycol. In another exemplary embodiment, the hydrophobic monomer comprises propylene oxide.

Further, the molecular weight of the retaining agent can influence the tenacity of the winter precipitation barrier composition, and can influence processing and application of the winter precipitation barrier composition. For example, the molecular weight can be selected such that the resulting winter precipitation barrier composition is a liquid. In an exemplary embodiment, the retaining agent is a liquid at standard application temperature (for example, temperatures of about −40 degrees Celsius to about 30 degrees Celsius). The molecular weight of the retaining agent can be selected such that the viscosity of the retaining agent is sufficiently high so that the winter barrier composition comprising the retaining agent will remain on the windshield for a sufficient time period to shield the windshield from winter precipitation, but a sufficiently low so that the retaining agent can be applied to the windshield and can be removed from the windshield when desired.

In one embodiment, the retaining agent has a viscosity from about 5 cSt (centiStokes) to about 100,000 cSt. In another embodiment, the retaining agent has a viscosity of from about 100 cSt to about 10,000 cSt.

In one embodiment, the composition comprises a polymer having an average molecular weight of about 100 u (unified atomic mass units) to about 10,000 u. In one exemplary embodiment, the composition comprises polymer having an average molecular weight of about 1,000 u to about 5,000 u. In one exemplary embodiment, the composition comprises a polymer having an average molecular weight of about 2,000 u to about 3,000 u. In an especially exemplary embodiment, the composition comprises a polymer having an average molecular weight of about 2,500 u to about 2,700 u, and more specifically about 2,600 u.

In one embodiment, the retaining agent comprises a polymer or a copolymer having primarily hydrophobic components. In one embodiment, the retaining agent comprises a polymer or a copolymer having primarily hydrophilic components. In one embodiment, the retaining agent comprises a polymer having both hydrophobic and hydrophilic components.

In one embodiment, the retaining agent comprises a polymer or a copolymer having at least OH group. In one exemplary embodiment, the retaining agent comprises a polyol polymer or copolymer. The polyol can have the general formula (I):

$$HOCH_2-(-CHOH-)_x-CH_2-OH \qquad (I)$$

In one embodiment, the retaining agent comprises a polymer having primarily hydrophobic propylene oxide components. In one embodiment, the retaining agent comprises a polyalkylene glycol material.

In one exemplary embodiment, the retaining agent can comprise a polyalkylene glycol base stock material. The amount and type of base stock material can be controlled to achieve a selected fluid performance level (i.e., a fluid having selected rheological properties, molecular weight, solubility, and volatility). Examples of polyalkylene glycol base stock material can include those sold under the UCON trademark by the Dow Chemical Company of Midland, Mich. Specifically, the polyalkylene glycol base stock material can include alcohol-started base stocks featuring oxypropylene groups with one terminal hydroxyl group such as those sold under the trade name UCON LB fluids. Further, the polyalkylene glycol base stock material can include alcohol-started base stocks containing equal weight amounts of oxyethylene and oxypropylene groups with a single terminal hydroxyl group such as those sold under the trade name UCON 50-HB fluids. Still further, the polyalkylene glycol base stock material can include diol-started base stocks containing 75 weight percent oxyethylene and 25 percent oxypropylene groups with two terminal hydroxyl groups such as those sold under the trade name UCON 75-HB fluids.

In one exemplary embodiment, the retaining agent comprises a polypropylene glycol polymer having a general formula (II):

$$H-(OCH_2CHCH_3)_n-OH \qquad (II.)$$

In one exemplary embodiment the retaining agent comprises a polypropylene glycol, which is a clear viscous liquid with a low pour point at application temperature. In one embodiment, the retaining agent comprises polypropylene glycol P1200 sold by the Dow Chemical Company of Midland, Mich. In other embodiments, the retaining agent can comprise any suitable polypropylene glycol including those sold by the Dow Chemical Company under the trade names polypropylene glycol PT250, polypropylene glycol PT700, polypropylene glycol PT3000, polypropylene glycol P425, polypropylene glycol P1000TB, polypropylene glycol P1200, polypropylene glycol P2000, polypropylene glycol P3000TB, and polypropylene glycol P4000.

In one embodiment, the retaining agent comprises a polyethylene glycol polymer having a general formula (III):

$$H-(OCH_2CH_2)_n-OH \qquad (III)$$

In another exemplary embodiment, the retaining agent comprises a methyoxypolyethylene glycol polymer having a general formula (IV):

$$CH_3-(OCH_2CH_2)_n-OH \qquad (IV.)$$

Examples of suitable polyethylene glycol polymers and methyoxypolyethylene glycol polymers include those sold under the CARBOWAX and CARBOWAX SENTRY trademarks by the Dow Chemical Company of Midland, Mich.

In one embodiment, the retaining agent comprises a CARBOWAX polyethylene glycol polymer. Examples of suitable CARBOWAX polyethylene glycol polymers include CARBOWAX polyethylene glycol 200, CARBOWAX polyethylene glycol 200E, CARBOWAX polyethylene glycol 300, CARBOWAX polyethylene glycol 300E, CARBOWAX polyethylene glycol 400, CARBOWAX polyethylene glycol 400E, CARBOWAX polyethylene glycol 600, and CARBOWAX polyethylene glycol 600E.

In one embodiment, the retaining agent comprises a CARBOWAX methoxypolyethylene glycol polymer. Examples of suitable methoxypolyethylene glycol polymers include CARBOWAX methoxypolyethylene glycol 350, CARBOWAX methoxypolyethylene glycol 350E, CARBOWAX methoxypolyethylene glycol 550, and methoxypolyethylene glycol 550E.

In one especially exemplary embodiment, the retaining agent comprises a polymer having both hydrophobic and hydrophilic components. In one especially exemplary embodiment, the retaining agent comprises a polyglycol copolymer comprising ethylene oxide monomers and propylene oxide monomers. In one especially exemplary embodiment, the retaining agent comprises a polyglycol copolymer comprising ethylene oxide monomers, propylene oxide monomers, and glycerol monomers.

In one especially exemplary embodiment, the retaining agent comprises a glycerol based ethylene oxide/propylene oxide copolymer. Examples of glycerol based ethylene oxide/propylene oxide copolymers include polyglycols sold by Dow Chemical Company of Midland, Mich. under the trade names Polyglycol EP 530, Polyglycol EP 1730, Polyglycol EP 436, Polyglycol EP 1660, Polyglycol 15-200, Polyglycol 112-2, and Polyglycol PT 7200. In one especially exemplary embodiment, the retaining agent comprises Polyglycol 15-200.

As mentioned previously, functional properties of the winter precipitation barrier composition can be controlled by controlling ratio of hydrophilic monomers to hydrophobic monomers. For example, the retaining agent can comprise about 0% hydrophilic monomer to about 100% hydrophilic monomer and more specifically about 0.1% hydrophilic monomer to about 99.9% hydrophilic monomer based on the total number of monomer units in the copolymer. Further, the retaining agent can comprise from 1% hydrophilic monomer to about 99% hydrophilic monomer and more specifically about 10% hydrophobic monomer to about 90% hydrophobic monomer based on the total number of monomer units in the copolymer.

In a specific exemplary embodiment where the retaining agent comprises ethylene oxide and propylene oxide, the functional properties of the winter frost barrier composition can be controlled by controlling the ratio of ethylene oxide to propylene oxide. For example, the retaining agent can comprise about 0% ethylene oxide to about 100% ethylene oxide monomer and more specifically about 0.1% ethylene oxide to about 99.9% ethylene oxide based on the total number of monomer units in the polymer or copolymer. Further, the retaining agent can comprise from 1% propylene oxide to about 99% propylene oxide and more specifically about 10% propylene oxide to about 90% propylene oxide based on the total number of monomer units in the copolymer.

In a specific exemplary embodiment where the retaining agent comprises a copolymer of ethylene oxide, propylene oxide, and glycerol, the functional properties of the winter barrier composition can be controlled by controlling the ratio of ethylene to propylene oxide to glycerol. For example, the retaining agent can comprise about 1% ethylene oxide to about 99% ethylene oxide monomer and more specifically about 10% ethylene oxide to about 90% ethylene oxide based on the total number of monomer units in the polymer or copolymer. Further, the retaining agent can comprise from 1% propylene oxide to about 99% propylene oxide and more specifically about 10% propylene oxide to about 90% propylene oxide based on the total number of monomer units in the polymer or copolymer. Further, the retaining agent can comprise from 1% glycerol to about 99% glycerol and more specifically about 10% glycerol to about 90% glycerol based on the total number of monomer units in the polymer or copolymer.

The solvent can be comprised of any media having certain functional properties. The functional properties include a freezing point and a boiling point suitable for use in low temperature environments where frost can form. The functional properties further include low reactivity with the polymer, low reactivity with the windshield surface, and low reactivity with the external environment (for example, atmospheric gases, and automotive plastics, metals, and finishes).

In one embodiment, the solvent comprises an alcohol. In one embodiment the solvent comprises a monoalcohol. Suitable monoalcohols include, for example, methanol, ethanol, isopropanol, higher alcohols, isomers of these alcohols, and combinations thereof. In one embodiment, the solvent comprises a glycol. Suitable glycols include, for example, ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,6-pentylene glycol, neopentyl glycol, hexane diols, and the like, and combinations comprising one or more of the foregoing glycols. In other embodiments, the solvent comprises an alcohol having more than two hydroxyl groups, such as glycerol and sugar alcohols.

In an exemplary embodiment, the solvent comprises both a monoalcohol and a glycol. In an especially exemplary embodiment the solvent comprises methanol and propylene glycol.

In one embodiment, the frost blocking composition comprises from about 0.1 weight % retaining agent to about 99.9 weight % retaining agent, more specifically, about 1 weight % to about 50 weight % retaining agent, more specifically, about 2 weight % to about 10 weight % retaining agent, and still more specifically, about 4 weight % to about 6 weight % retaining agent. In one embodiment, the frost blocking composition comprises from about 1 weight % to 99.9 weight % solvent, more specifically about 10 to 90 weight % solvent and still more specifically about 94 to 96 weight % solvent.

In an exemplary embodiment, the composition comprises about 50 weight % to about 80 weight % methanol, about 20 weight % to about 40 weight % propylene glycol, and about 1 weight % to about 10 weight % retaining agent. In an especially exemplary embodiment, the composition comprises about 64 weight % to about 66 weight % methanol, about 29 weight % to about 31 weight % propylene glycol, and about 4 weight % to about 6 weight % retaining agent. In an especially exemplary embodiment, the composition comprises or consists of about 64 weight % to about 66 weight % methanol, about 29 weight % to about 31 weight % propylene glycol, and about 4 weight % to about 6 weight % retaining agent comprising a copolymer having hydrophobic and hydrophilic portions.

The types and amounts of polymers and solvents can be selected such that the winter precipitation barrier composition has other functional properties. For example, in one embodiment, the winter precipitation barrier composition will have a freezing point of less than −30 degrees Celsius and more specifically less than −60 degrees Celsius. In one embodiment, the winter precipitation barrier composition will have a boiling point of greater than 20 degrees Celsius.

The winter precipitation barrier is specifically formulated to provide a specific durability allowing the composition to remain on a windshield surface for a selected time period. For example, in one embodiment, a significant amount of the winter precipitation barrier composition (e.g., an amount greater or equal to 1% of the originally disposed amount) will remain disposed on an windshield for a time period of greater than 2 hours and more specifically for a time period of greater than 18 hours while being subjected to frost conditions, snow flurries, and wind. Further, the composition maintains its operational effectiveness (that is, its effectiveness in impeding frost and facilitating the removal of snow) during this time period. In addition to the hydrophobic and hydrophilic properties of the polymer, the durability of the polymers can be related to properties of the polymer including, for example, molecular weight, ratio of EO/PO, solubility, functional groups, and viscosity.

In other exemplary embodiments other additives can be utilized in composition. However, in one especially exemplary embodiment, the disclosed winter precipitation barrier compositions will not contain any additives and will consist solely of a retaining agent and a solvent.

In another embodiment, the winter precipitation barrier composition also optionally comprises an auxiliary component. The term 'auxiliary component' as used herein refers to compounds or materials that assist in the frost prevention effect of the polymer compound. The assistance of the auxiliary compound may be a synergistic effect with regards to the polymer or an additive effect such as that resulting from a material that lowers the freezing point of the overall winter precipitation barrier composition.

Illustrative examples of suitable optional auxiliary components include silicone oils, fluorinated polyether diols, or a combination comprising one or more of the foregoing auxiliary compounds.

In one exemplary embodiment, the auxiliary component may be a low viscosity component having a viscosity of less than or equal to about 5000 centipoises. Illustrative examples of such low viscosity components include silicone oils.

The term "silicone oil" as used herein refers to a molecule with a —(SiO—)$_n$ backbone that completes its valency with methyl groups only.

Suitable fluorinated polyether diols may be prepared using oxetane chemistry and are commercially available from Omnova Solutions Inc. under the trade name PolyFox®, including PolyFox® 6320, 6520, 636, 656, and combinations comprising one or more of the foregoing fluorinated polyether diols.

In one embodiment, the optional auxiliary compound comprises about from about 0 wt % to about 50 wt % of the total weight of the winter precipitation barrier composition. In another embodiment, the auxiliary compound comprises about 1 wt % to about 40 wt % of the total weight of the winter precipitation barrier composition. In another embodiment, the auxiliary compound comprises about 25 wt % to about 35 wt % of the total weight of the winter precipitation barrier composition.

When the auxiliary compound is silicone oil, the silicone oil may, for example, comprise about 1 wt % to about 5 wt % of the total weight of the windshield treatment composition.

The winter precipitation barrier composition may further optionally comprise a humectant. The term 'humectant' as used herein refers to a material or compound that is hydroscopic and water-soluble and is less volatile than the solvents, and/or other optional auxiliaries. In one embodiment, the humectant will be less volatile than other optional auxiliaries. It will be appreciated that, in some cases, a compound may behave functionally as both a humectant and an optional auxiliary.

Illustrative examples of suitable humectants include polyols such as polyalcohols. Suitable examples include glycerin, sorbitol, the like and combinations of such.

Optional humectants may be used in amounts of from about 0 to 10% by weight, based on the total weight of the winter precipitation barrier composition. In another embodiment, humectants may be present in an amount of from 0.1 to 9% by weight, based on the total weight of the winter precipitation barrier composition.

The barrier composition may also comprise additional components such as buffering agents as well as inert components such as, for example, rheology/viscosity modifiers, surfactants, detergents, foaming/defoaming additives, dyes, colorants, fragrances, combinations thereof, and the like.

Suitable buffering agents include, for example, organic and inorganic acids and bases, including salts thereof, such as mono- or poly-alkali metal, alkaline earth metal or amine salts of carbonic acid, phosphoric acid, sulfuric acid, hydrosulfuric acid, a $C_1$-$C_6$ organo-, mono- or poly-carboxylic acid, or a $C_2$-$C_{30}$ alkyleneiminopolycarboxylic acid, ammonia, a $C_1$-$C_{30}$ organic base, or a combination comprising one or more of the foregoing buffering agents. Exemplary buffering agents include sodium bicarbonate, sodium carbonate, ammonium hydroxide, ammonium carbonate, sodium borate, mono-, di-, or trisodium phosphate, mono-, di-, or tripotassium phosphate, ammonium sodium phosphate, mono-, or disodium sulfate, acetic acid, sodium acetate, potassium acetate, ammonium acetate, calcium acetate, sodium formate, mono-, or disodium sulfide, ammonia, mono-, di, or triethylamine, mono-, di-, or triethanolamine, (ethylenedinitrilo) tetraacetic acid sodium salt (sodium E.D.T.A.), pyridine, aniline, sodium silicate, and combinations comprising one or more of the foregoing buffering agents.

The disclosed winter precipitation barrier compositions may be prepared by admixture of the foregoing components according to known windshield composition preparation techniques. In one exemplary embodiment, the retaining agent will be mixed with one or more monoalcohols before admixture with the remaining components.

The disclosed method of simultaneously preventing frost and facilitating removal of winter precipitation relative to a windshield comprises applying to a windshield the disclosed winter precipitation barrier compositions. The step of applying the disclosed winter precipitation barrier compositions may be done in any manner capable of providing a continuous film of the winter precipitation barrier on the windshield.

Illustrative examples of suitable application methods include spraying, rolling, wiping, pouring, and combinations thereof. Illustrative examples of spray applications include application via—a trigger sprayer, a pressurized or aerosol sprayer, or the windshield washer reservoir of an automobile, for example. Application via rolling may be accomplished either manually or automatically with the use of a saturated roller such as is used for the application of coatings. Wiping can be accomplished either manually or automatically with simple cloths or papers. An example of a combination application would be with the windshield washer reservoir of an automobile in combination with the action of the windshield wipers.

After application, in one embodiment, the applied winter precipitation barrier will be free of additional movement or activity. That is, in one embodiment, the winter precipitation barrier will be applied after the vehicle is stopped and is at rest. In one exemplary embodiment, the winter precipitation barrier will be applied immediately prior to a period of time when frost is known to accumulate. For example, ill one especially exemplary embodiment, the winter precipitation barrier composition will be applied when the vehicle is parked for the night or when the vehicle will be unused for several hours and is exposed to frost generating conditions.

In addition, the disclosed methods may be characterized by the lack of certain steps required by the prior art. In one embodiment, the disclosed methods do not require any pre-cleaning or pretreatment of the windshield. In another embodiment, the disclosed methods do not require the application of curing stimulus, including, but not limited to, elevated temperature and/or electromagnetic energy. In yet another embodiment, the disclosed methods are characterized by the lack of any post-application steps such as wiping, rinsing, buffing, cleaning, removal, or the like. It will be appreciated that the terms 'cleaning or removal' as used in the preceding sentence do not include any incidental removal of the applied winter precipitation barrier composition occurring as a result of the removal by winter precipitation. In one exemplary embodiment, the disclosed methods are characterized by the lack of any post-application treatments such as the application of additional coatings, waxes, or the like that are intended to bond to the applied winter precipitation barrier composition.

EXAMPLE

Example 1

Windshield Treatment Composition

In the example 1, a windshield treatment composition was made by combining the following components: Methanol—65 weight %, Propylene glycol—30 weight %, Polyglycol 15-200—5 weight %, based on the total weight of the composition.

The polymer used in Example 1 is a copolymer comprising ethylene glycol monomers, propylene glycol monomers, and glycerol monomers.

The composition was sprayed onto an automobile windshield with a trigger sprayer and left overnight, (at least one hour or more) at ambient New England winter conditions, starting at about $-10°$ C. to about $10°$ C. and decreasing to about $-20°$ C. to about $0°$ C. ovenight. A control portion of the windshield received no treatment. On the control portion of the windshield, a hard frost typically formed, whereas the treated portion of the windshield had visibly less frost accumulation. The frost on the treated portion of the windshield was more easily removed than the control area using windshield wipers. This was consistently true as observed in numerous daily trials over two (2) winter months with heavy frost accumulation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A winter precipitation barrier composition comprising:
   a retaining agent comprising a unit derived from a glycerol monomer and
   a solvent comprising a mixture of methanol and propylene glycol.

2. The winter precipitation barrier composition of claim 1, wherein the retaining agent comprises a primarily hydrophobic monomer or a hydrophilic monomer.

3. The winter precipitation barrier composition of claim 1, wherein the retaining agent comprises both a hydrophobic monomer and a hydrophilic monomer.

4. The winter precipitation barrier composition of claim 1, wherein the retaining agent comprises an ethylene oxide monomer.

5. The winter precipitation barrier composition of claim 1, wherein the retaining agent comprises a propylene oxide monomer.

6. The winter precipitation barrier composition of claim 1, wherein the retaining agent comprises a copolymer comprising ethylene oxide, propylene oxide, and glycerol.

7. The winter precipitation barrier composition of claim 1, wherein the retaining agent comprises a polymer or copolymer having a molecular weight of from about 100 unified atomic mass units to about 10,000 unified atomic mass units.

8. The winter precipitation barrier composition of claim 7, wherein the retaining agent comprises a polymer or copolymer having a the molecular weight of from about 2,000 unified atomic mass units to about 3,000 unified atomic mass units.

9. The winter precipitation barrier composition of claim 8, wherein the retaining agent comprises a polymer or copolymer having a molecular weight of about 2600 unified atomic mass units.

10. The winter precipitation barrier composition of claim 1, wherein the composition has a freezing point of less than 0 degrees Celsius.

11. The winter precipitation barrier composition of claim 10, wherein the composition has a freezing point of less than −30 degrees Celsius.

12. The winter precipitation barrier composition of claim 1, wherein the composition has a viscosity of greater than 0.1 cSt.

13. The winter precipitation barrier composition of claim 12, wherein the composition has a boiling point of greater than 20 degree Celsius.

14. The winter precipitation barrier composition of claim 1, comprising about 1 weight % to about 99.9 weight % solvent.

15. The winter precipitation barrier composition of claim 1, wherein the composition comprises about 0.1 weight % to about 99 weight % retaining agent.

16. The winter precipitation barrier composition of claim 1, wherein the composition comprises about 65% weight methanol, about 30% weight propylene glycol, and about 5 weight % retaining agent.

17. A winter precipitation barrier composition consisting essentially of:
   a retaining agent comprising a polymer having both hydrophilic and hydrophobic monomers; and
   a solvent comprising a monoalcohol and propylene glycol,
   wherein the composition is free of any components comprising a silicon atom.

18. The winter precipitation barrier composition of claim 17 wherein the monoalcohol is methanol.

19. A method for impeding ice formation on a windshield, wherein the winter precipitation barrier composition of claim 17 is applied to a windshield such that the composition both reduces a rate of frost deposition on the windshield and reduces the adhesion strength between winter precipitation and the windshield.

20. A method for impeding ice formation on a windshield, wherein a winter precipitation barrier composition winter precipitation barrier composition comprising: a retaining agent comprising a unit derived from a glycerol monomer and
   a solvent comprising glycol is applied to a windshield such that the composition both reduces a rate of frost deposition on the windshield and reduces the adhesion strength between winter precipitation and the windshield.

21. The method of claim 20 wherein the applied composition remains on the windshield for a period of at least one hour.

22. The method of claim 20 wherein the composition is applied to a windshield that has not been precleaned or pretreated.

* * * * *